Dec. 17, 1957  W. I. GILBERT ET AL  2,816,905
CATALYTIC TREATMENT OF HYDROCARBONS CONTAINING
OXYGENATED COMPOUNDS
Filed Dec. 29, 1952  2 Sheets-Sheet 1
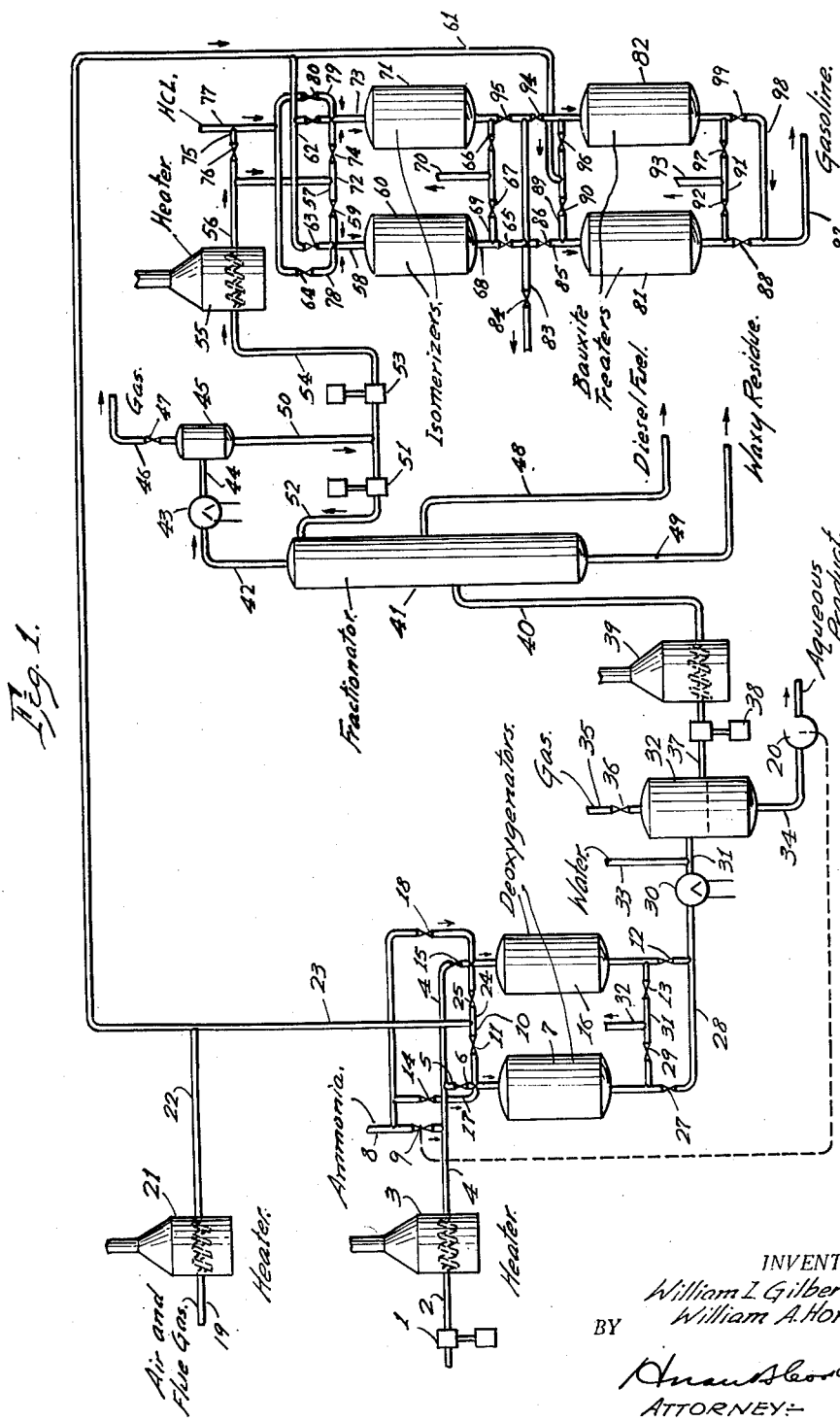
INVENTORS.
William I. Gilbert and
William A. Horne.
BY
ATTORNEY:-

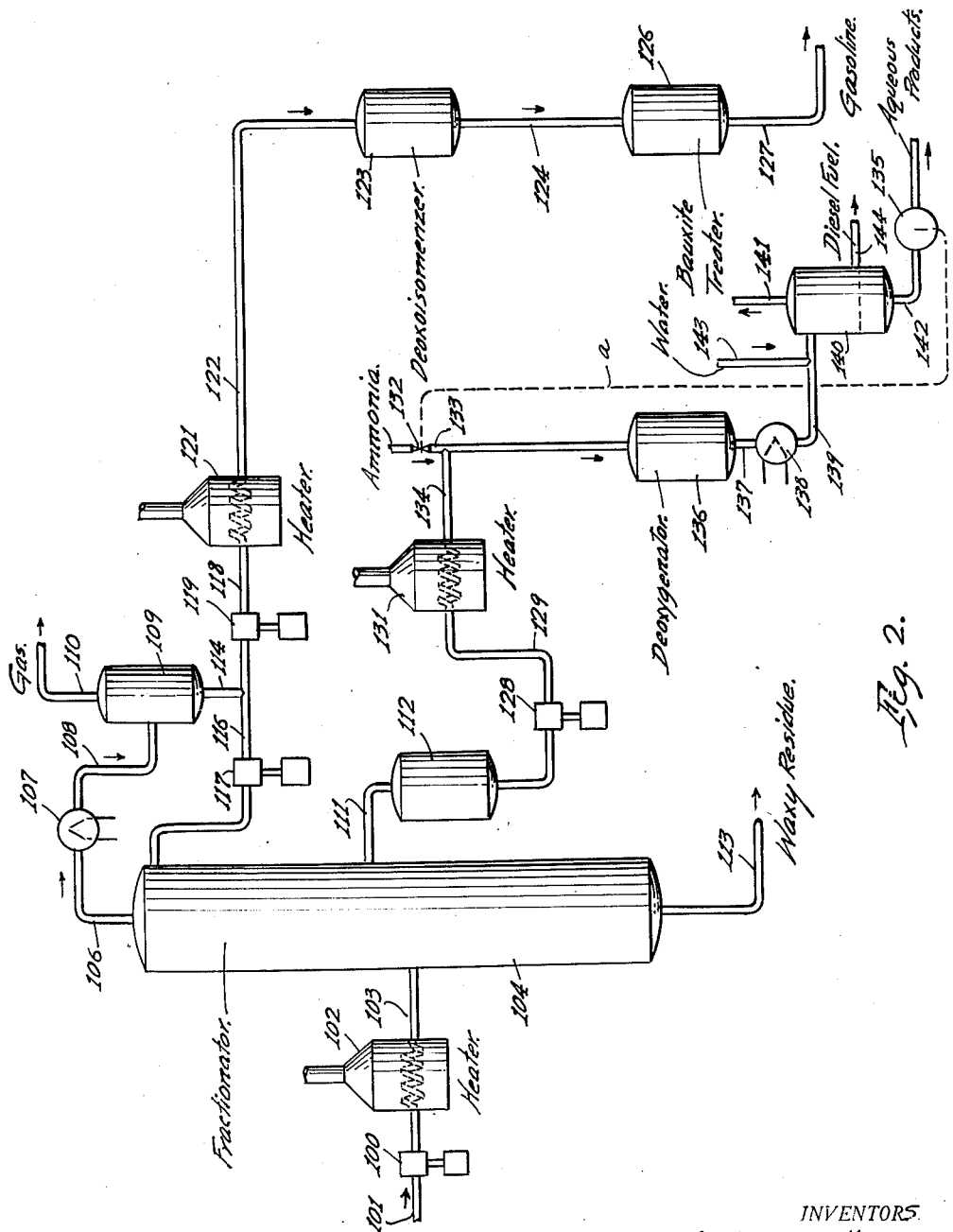

United States Patent Office 2,816,905
Patented Dec. 17, 1957

2,816,905

CATALYTIC TREATMENT OF HYDROCARBONS CONTAINING OXYGENATED COMPOUNDS

William I. Gilbert and William A. Horne, Oakmont, Pa., assignors to Gulf Research & Development Company, Pittsburgh, Pa., a corporation of Delaware Application December 29, 1952, Serial No. 328,356

11 Claims. (Cl. 260—450)

This invention relates to the catalytic treatment of the total liquid hydrocarbon product and more particularly the hydrocarbon fraction comprising diesel fuel obtained by the reaction of carbon monoxide and a hydrogen-containing gas in the presence of a Fischer-Tropsch catalyst.

The catalytic hydrogenation of carbon monoxide in the presence of a Fischer-Tropsch catalyst at temperatures up to about 750° F. under super-atmospheric pressure produces a variety of substances, the predominance of a particular substance depending upon the particular operating conditions employed in carrying out the synthesis. In general, the materials which are produced by the synthesis reaction comprise organic oxygenated compounds and hydrocarbons. The hydrocarbons thus produced comprise straight chain olefins and paraffins. The present invention is concerned with the treatment of the hydrocarbons.

The hydrocarbons which are separated from the reaction products obtained in the synthesis process invariably contain a small amount of the organic oxygenated compounds. The organic oxygenated compounds, which may comprise alcohols, aldehydes, ketones, and acids, are undesirable in hydrocarbons boiling in the motor fuel boiling range in that they greatly decrease the octane number of the motor fuel. Likewise, the oxygenated compounds have a deleterious effect on the cetane number of hydrocarbons boiling in the diesel fuel boiling range.

Attempts have been made to hydrogenate carbon monoxide to produce hydrocarbons devoid of oxygenated compounds, but invariably small amounts of the latter are formed. Methods have been devised for separating the oxygenated compounds from the hydrocarbons, but these methods for one or more reasons have not been entirely satisfactory.

The present invention is directed to a process which not only converts to more desirable compounds the objectionable oxygenated compounds which are associated with the hydrocarbons produced by the reaction of carbon monoxide and hydrogen in the presence of a Fischer-Tropsch catalyst, but also improves the octane rating and the cetane rating of the hydrocarbons boiling in the motor fuel and diesel fuel boiling ranges, respectively.

The process of the present invention comprises passing a synthetic oxygen-containing hydrocarbon fraction comprising diesel fuel at a temperature between about 500° and about 1100° F. under substantially non-isomerizing conditions over a catalyst comprising alumina. For example, we have found that by passing a hydrocarbon fraction comprising diesel fuel containing olefins and oxygenated compounds together with a small amount of ammonia at a temperature of about 500° to about 1100° F. over a catalyst comprising alumina, the oxygenated compounds are deoxygenated and the olefinic hydrocarbons are inhibited against isomerization. By this process the cetane number of the diesel fuel is greatly improved over the untreated diesel fuel or a diesel fuel which has undergone isomerization during deoxygenation. While the ammonia is advantageously passed in combination with the hydrocarbon fraction over the alumina catalyst, good results can be obtained by intermittently treating the catalyst with ammonia followed by the introduction of the hydrocarbon charge.

Deoxygenation in the presence of ammonia can be carried out either at atmospheric or superatmospheric pressure, i. e. pressures from 0 to 200 pounds per square inch gauge. The space velocity may be in the order of about 0.1 to 20 volumes of liquid charge per volume of catalyst per hour. Good results are obtained at a temperature of about 550° to 750° F., a space velocity of about 0.5 to 2.0, and atmospheric pressure. The amount of ammonia added to the charge is relatively small in comparison with the hydrocarbon charge. The amount of ammonia added is at least sufficient to maintain the pH of the aqueous product above about 6.5. The exact amount of ammonia will vary depending upon the acidity of the charge and also upon the particular catalyst used. In general, however, the ratio of amonia to liquid hydrocarbon comprises about 0.0005 to 0.0025 volume of liquid ammonia per volume of liquid hydrocarbon charge. When the catalyst is intermittently treated with ammonia, the amount of ammonia so employed is approximately equal to that which would be employed if the ammonia were added continuously. Treating of the catalyst with ammonia is continued until the olefin isomerizing activity of the catalyst is substantially inhibited. In addition to alumina, we may also employ fuller's earth, bauxite, or the like. The physical shape of the catalyst depends upon whether the process is carried out in a stationary fixed-bed reactor or a reactor of the type employed for fluid catalytic cracking.

The effect of a small amount of ammonia on the catalytic activity of alumina in the isomerization of olefins can be illustrated in connection with the isomerization of butene-1 to butene-2. When substantially pure butene-1 (99 percent) was passed at a gaseous space velocity of about 505 volumes of butene-1 per volume of catalyst per hour through a tube packed with alumina at a temperature between about 550° and 575° F., the resulting product contained about 23 percent butene-1 and 75 percent butene-2. When ammonia was added to the butene-1 charge in an amount of about 0.6 volume percent (0.0018 volume of ammonia per volume of butene) and then passed through the alumina under conditions similar to those just described, the resulting product contained about 98 percent butene-1 and only 2 percent butene-2. Additional tests in which no ammonia was added to the charge but which were made after the alumina had been contacted previously with ammonia indicated that when the alumina had once encountered ammonia, the alumina was thereafter over a prolonged period of time effectively inhibited against promoting the isomerization of olefins.

The present invention will be described more fully hereinbelow in conjunction with the accompanying flow diagrams which illustrate diagrammatically various embodiments of the invention.

Figure 1 illustrates one embodiment of the invention wherein the total hydrocarbon fraction containing oxygenated compounds dissolved therein obtained by the reaction of carbon monoxide and hydrogen is passed over an alumina catalyst in the presence of ammonia. The hydrocarbon product is then fractionated into hydrocarbons boiling in the motor fuel boiling range, hydrocarbons boiling in the diesel fuel boiling range, and residual hydrocarbons comprising a waxy residue. The hydrocarbons boiling in the motor fuel boiling range are then passed over an alumina catalyst impregnated with anhydrous hydrogen chloride.

Figure 2 illustrates another embodiment of the invention whereby the total hydrocarbon fraction containing oxygenated compounds is separated into a fraction boiling in the motor fuel boiling range, a fraction boiling in the diesel fuel boiling range, and a residual fraction comprising a waxy residue. The motor fuel fraction is then passed over an alumina catalyst impregnated with anhydrous hydrogen chloride. The diesel fuel fraction is passed over an alumina catalyst in the presence of ammonia.

Now referring to Figure 1, a hydrocarbon fraction containing olefins and organic oxygenated compounds obtained, for example, from the reaction of carbon monoxide and hydrogen in a Fischer-Tropsch process (not shown) is passed by pump 1 through conduit 2 to heater 3. The hydrocarbon fraction may comprise up to 5 weight percent butanes and lighter, 50 to 80 weight percent boiling within the range of from room temperature to 400° F. comprising hydrocarbons boiling in the motor fuel boiling range, 10 to 20 weight percent boiling within the range 400° to 650° F. comprising hydrocarbons boiling in the diesel fuel boiling range, and 10 to 25 weight percent waxy residue boiling above about 650° F.

By means of heater 3 the hydrocarbon charge is heated to a temperature within the range of about 500° to about 1100° F. The heated charge is then passed by conduits 4 and 5 and valve 6 into deoxygenator 7. A small amount of ammonia as needed is introduced in controlled amounts into conduit 4 by conduit 8 containing flow control valve 9. The amount of ammonia introduced is controlled by pH meter 20. When the pH of the water released in the deoxygenation reaction falls below about 6.5, flow valve 9 automatically opens to allow more ammonia to be introduced with the charge. It should be understood of course that this valve can be of the manual type if so desired.

The hydrocarbon charge is passed through deoxygenator 7 until the extent of deoxygenation falls below a selected level. When deoxygenation falls below the desired amount, the hydrocarbon charge is diverted from deoxygenator 7 to deoxygenator 16. When this is done, valve 6 is closed and valve 15 is opened. Deoxygenator 7 is then placed on the regeneration cycle. Regeneration of the catalyst may be accomplished at atmospheric or superatmospheric pressure. The regeneration is preferably accomplished by purging the catalyst with flue gas or steam followed by contacting the purged catalyst with air diluted with flue gas or steam. The air and flue gas is introduced by conduit 19 into heater 21 wherein the gas may be heated to a temperature sufficient to initiate and maintain combustion, usually about 750° to 800° F. The heated gas then passes through conduits 22, 23, and 10, and valve 11 to deoxygenator 7. When deoxygenator 7 is on the regeneration cycle, valve 27 in conduit 28 is closed and valve 29 in conduit 31 is opened so that the combustion products can escape through conduit 32. Prior to reintroducing hydrocarbon charge into deoxygenator 7, the regenerated catalyst may be treated with ammonia by opening valve 14 in conduit 17.

When the activity of the catalyst falls below the desired level in deoxygenator 16, valves 6, 11, 12, 13, 15, 25, 27, and 29 are returned to their original positions. Deoxygenator 16 is then placed on the regeneration cycle. When deoxygenator 16 is on the regeneration cycle, valve 12 is closed and valve 13 is opened.

The deoxygenated hydrocarbon product issuing from the bottom of either of the deoxygenators is passed by conduit 28 through heat exchanger 30 and conduit 31 to separator 32. To increase the removal of excess ammonia, water is injected into conduit 31 through conduit 33. In separator 32 the aqueous product is separated from the hydrocarbon product. The aqueous product is withdrawn by conduit 34 through pH meter 20. Gas is released from separator 32 by conduit 35 containing pressure control valve 36. The hydrocarbon product is removed from separator 32 by conduit 37. The hydrocarbon product is then passed by pump 38 through heater 39 and conduit 40 to fractionator 41. In fractionator 41 the deoxygenated product comprising hydrocarbons is separated into three fractions. A fraction comprising hydrocarbons boiling in the motor fuel boiling range together with some light hydrocarbon gases is removed from the top of fractionator 41 by conduit 42. This vaporous overhead product is then passed through condenser 43 and conduit 44 to receiving vessel 45. Any light gases present are removed from vessel 45 by conduit 46 containing valve 47. A fraction comprising hydrocarbons boiling in the diesel fuel boiling range is removed from fractionator 41 by conduit 48. A waxy residual hydrocarbon fraction is removed from the bottom of fractionator 41 by conduit 49.

The condensed hydrocarbon fraction boiling in the motor fuel boiling range is removed from vessel 45 by conduit 50. A portion of this motor fuel fraction is returned as reflux to fractionator 41 by pump 51 and conduit 52. The remainder of the motor fuel fraction is passed by pump 53 through conduit 54 to heater 55. In heater 55 the motor fuel hydrocarbon fraction is heated to a temperature of about 500° to about 1100° F. The heated hydrocarbon fraction is then passed by conduits 56, 57, and 58, and valve 59 to isomerizer 60.

The motor fuel hydrocarbon fraction is passed through isomerizer 60 at a space velocity between about 0.1 and 20 volumes of charge per volume of catalyst per hour at a pressure between about atmospheric and 200 pounds per square inch. Good results are obtained when the reaction is carried out at 700° to 800° F., 0.3 to 1.3 space velocity and atmospheric pressure. The catalyst used in the isomerization reactor may be any of the catalysts used in promoting the isomerization of olefinic hydrocarbons. We preferably employ alumina impregnated with anhydrous hydrogen chloride. The physical shape of the alumina catalyst has no apparent effect upon its catalytic activity. When the isomerization is carried out in fixed-bed type reactors as shown in Figures 1 and 2, the catalyst is advantageously in the form of ⅜ inch pellets or 4 to 8 mesh granules.

As the catalyst is used, a deposit of carbonaceous material is laid down upon the catalyst surface, thereby reducing its activity and necessitating periodic burn-offs. Burning off can be accomplished by purging the catalyst with flue gas or steam followed by contacting the purged catalyst with air diluted with flue gas or steam. Burning off is carried out at a temperature below the sintering temperature of the catalyst, i. e. below about 1100° F.

Burning off of the purged catalyst can be accomplished by intoducing air and flue gas into isomerizer 60 through conduits 61 and 62 and valve 63. It will be understood, of course, that when the catalyst is being regenerated, valves 59, 64, 65, and 66 are closed and valves 63 and 67 are opened. Combustion products pass from the bottom of isomerizer 60 through conduits 68 and 69 and valve 67 to vent 70. When the catalyst in isomerizer 60 is being regenerated, the motor fuel fraction is then introduced into isomerizer 71 through conduits 56, 72, and 73 by valve 74. If desired, a small amount of hydrogen chloride may be introduced with the charge, in which case it is introduced into conduit 56 by conduit 75 and valve 76. Ordinarily, the addition of hydrogen chloride with the charge is not necessary. The hydrogen chloride is usually passed over the alumina only after the activity of the catalyst has decreased below a desired minimum activity. Reactivation is then accomplished by treating the catalyst which has been burned off with 1 to 20 volumes of anhydrous hydrogen chloride per volume of catalyst at room temperature and gradually raising the temperature to that of the reaction. When anhydrous hydrogen chloride is required for reactivation, it is introduced into the isomerizer 60 by conduits 77, 78, and 58 by opening valve 64. Likewise, when anhydrous hydrogen chloride is required for reactivation in isomerizer 71, it may be introduced by conduits 77, 79, and 73 by opening valve 80.

When introducing anhydrous hydrogen chloride with the charge and when the catalyst has been freshly reactivated, small quantities of it may pass out of the isomerizers with the hydrocarbon product. Chlorine has a detrimental effect upon the lead susceptibility of the product and therefore should be removed. Accordingly the hydrocarbon product issuing from the bottom of either isomerizer 60 or isomerizer 71 is introduced into one of two bauxite treaters 81 and 82. Of course, when no chlorine is present in the product, it may be withdrawn from the system by conduit 83 containing valve 84. When the product contains chlorine, it is introduced into bauxite treater 81 by conduit 85 containing valve 86. The treating is advantageously carried out at 400° to 950° F. and space velocities of 0.1 to 30 volumes of gasoline per volume of bauxite per hour. The dechlorinated product is removed from bauxite treater 81 by conduit 87 containing valve 88. When the bauxite treater 81 is no longer effective for removing chlorine from the product, this treater is removed from the system by the proper adjustment of valves and is thereafter placed on regeneration by the introduction of air or flue gas which has been heated to about 750° to about 800° F. The air or flue gas is introduced into the bauxite treater 81 through conduits 61 and 89 and valve 90. The products of combustion are passed through conduits 87 and 91 and valve 92 to vent 93. When bauxite treater 81 is on the regeneration cycle, bauxite treater 82 is "on stream." When bauxite treater 82 is "on stream," valves 88, 94, 95, 96, and 97 are adjusted so that dechlorinated product is withdrawn from bauxite treater 82 through conduit 98 containing valve 99. Treated motor fuel is removed through conduit 87.

Now referring to Figure 2, the process of the invention will be described in connection with another embodiment. In this embodiment the regeneration system is not shown and only one each of the various reactors is illustrated. It will be understood, of course, that a plurality of reactors and various schemes of regeneration can be employed.

Hydrocarbon charge containing olefins and organic oxygenated compounds is introduced by pump 100 through conduit 101 to heater 102. The heated charge is then passed through conduit 103 to fractionator 104. In fractionator 104 the charge is separated into three fractions. A fraction comprising hydrocarbons and oxygenated compounds boiling in the motor fuel boiling range is removed overhead from fractionator 104 by conduit 106 through condenser 107 and conduit 108 to receiving vessel 109. Any light gases present are removed from vessel 109 by conduit 110. A fraction comprising hydrocarbons and oxygenated compounds boiling in the diesel fuel boiling range is removed from fractionator 104 by conduit 111 and collected in a receiving vessel 112. A waxy residual fraction comprising hydrocarbons and oxygenated compounds boiling above about 650° F. is removed from the bottom of fractionator 104 through conduit 113.

The motor fuel fraction collected in vessel 109 is recycled in part as reflux to fractionator 104 by conduits 114 and 116 and pump 117. The remainder of this fraction is passed through conduits 114 and 118 by pump 119 to heater 121. The hydrocarbon charge is heated in heater 121 to a temperature of about 500° to about 1100° F. and then passed through conduit 122 to a deoxoisomerizer 123. In deoxoisomerizer 123 the fraction boiling in the motor fuel boiling range is simultaneously deoxygenated and isomerized. This process may be carried out as described in U. S. Patent No. 2,589,273 to Charles W. Montgomery and William I. Gilbert. Briefly stated, the process comprises passing the fraction boiling in the motor fuel boiling range containing olefins and oxygenated compounds at a temperature of from 300° to 600° C. over a catalyst comprising alumina impregnated with anhydrous hydrogen chloride.

When periodic burn-offs and reactivation of the catalyst are necessitated, deoxoisomerizer 123 is placed on the regeneration cycle and the charge is diverted to another reactor not shown. When the catalyst has been freshly impregnated with anhydrous hydrogen chloride, the product invariably contains some chlorine. The chlorine thus introduced has a detrimental effect upon the lead susceptibility of the product. Accordingly, dechlorination of the product is effected by passing the product from deoxoisomerizer 123 through conduit 124 to bauxite treater 126. The product from deoxoisomerizer 123 is passed through treater 126 at about 400° to about 950° F. and a space velocity of 0.1 to 30 volumes of gasoline per volume of bauxite per hour. Dechlorinated gasoline is removed by conduit 127.

The fraction comprising diesel fuel containing olefins and oxygenated compounds collected in receiving vessel 112 is passed by pump 128 through conduit 129 to heater 131. The fraction is heated to a temperature of about 500° to about 1100° F. in heater 131. A small amount of ammonia is introduced into conduit 134 by flow control valve 132 and conduit 133. The amount of ammonia introduced is controlled by pH meter 135. When the pH of the aqueous product falls below about 6.5, flow valve 132 opens to allow more ammonia to be introduced with the diesel fuel fraction. The combined diesel fuel and ammonia stream is then introduced into deoxygenator 136. Deoxygenator 136 is maintained at about 500° to about 1100° F. while passing the charge through the catalyst at a space velocity of 0.1 to 20 volumes of charge per volume of catalyst per hour. Deoxygenation is carried out under conditions similar to those employed in deoxygenators 7 and 16 described in connection with Figure 1.

Deoxygenated diesel fuel together with water formed during deoxygenation and any excess ammonia are removed from deoxygenator 136 by conduit 137. The deoxygenated product is then passed through condenser 138 and conduit 139 to diesel fuel receiving vessel 140. To increase the removal of excess ammonia, water is injected into conduit 139 by conduit 143. Aqueous product is removed from vessel 140 by conduit 142 through pH meter 135. Diesel fuel is removed from vessel 140 by conduit 144. Gas is released from vessel 140 by conduit 141.

While the embodiments described in connection with Figures 1 and 2 illustrate carrying out the invention in fixed-bed reactors, it should be understood that the invention is not so limited and that the fixed-bed reactors can be replaced with reactors of the moving bed or fluid type such as those employed in the catalytic cracking of hydrocarbons.

The deoxoisomerizer referred to herein is a reactor in which simultaneous deoxygenation and isomerization take place. In this reactor oxygenated compounds are converted to olefins, the straight chain olefins are isomerized to branched chain olefins, and terminal double bonds are shifted toward the center of such unsaturated molecules.

This invention has been described with particular reference to certain embodiments and specific examples, but it is not limited to such embodiments or examples except as defined in the appended claims.

We claim:

1. A process for deoxygenating a hydrocarbon fraction comprising diesel fuel containing olefins and oxygenated compounds obtained by the reaction of carbon monoxide and a hydrogen-containing gas which comprises passing said hydrocarbon fraction at a temperature of about 500° to about 1100° F. over a catalyst selected from the group consisting of alumina, fuller's earth and bauxite in the presence of ammonia in an amount sufficient to substantially inhibit hydrocarbon isomerization and to maintain the pH of the aqueous product above about 6.5.

2. A process for deoxygenating a hydrocarbon fraction comprising diesel fuel containing olefins and oxygenated compounds obtained by the reaction of carbon monoxide and a hydrogen-containing gas which comprises passing said hydrocarbon fraction together with ammonia in an amount sufficient to substantially inhibit hydrocarbon isomerization and to maintain the pH of the aqueous product above about 6.5, at a temperature of about 500° to about 1100° F. over a catalyst selected from the group consisting of alumina, fuller's earth and bauxite.

3. A process for deoxygenating a hydrocarbon fraction comprising diesel fuel containing olefins and oxygenated compounds obtained by the reaction of carbon monoxide and a hydrogen-containing gas which comprises passing said hydrocarbon fraction together with ammonia in an amount sufficient to substantially inhibit hydrocarbon isomerization and to maintain the pH of the aqueous product above about 6.5, at a temperature of about 500° to about 1100° F. over a catalyst selected from the group consisting of alumina, fuller's earth and bauxite at a space velocity of about 0.1 to 20 volumes of liquid hydrocarbon per volume of catalyst per hour.

4. A process for deoxygenating a hydrocarbon fraction comprising diesel fuel containing olefins and oxygenated compounds obtained by the reaction of carbon monoxide and a hydrogen-containing gas which comprises passing said hydrocarbon fraction together with ammonia in an amount sufficient to substantially inhibit hydrocarbon isomerization and to maintain the pH of the aqueous product above about 6.5, at a temperature of about 500° to about 1100° F. over a catalyst selected from the group consisting of alumina, fuller's earth and bauxite at a space velocity of about 0.1 to 20 volumes of liquid hydrocarbon per volume of catalyst per hour at a pressure not in excess of about 200 pounds per square inch.

5. A process for deoxygenating a hydrocarbon fraction comprising diesel fuel containing olefins and oxygenated compounds obtained by the reaction of carbon monoxide and a hydrogen-containing gas which comprises passing said hydrocarbon fraction together with ammonia in an amount sufficient to substantially inhibit hydrocarbon isomerization and to maintain the pH of the aqueous product above about 6.5, at a temperature of about 550° to about 750° F. over a catalyst selected from the group consisting of alumina, fuller's earth and bauxite at a space velocity of about 0.5 to 2.0 and substantially atmospheric pressure.

6. A process for the catalytic treatment of the total liquid hydrocarbon product containing olefins and oxygenated compounds obtained by the reaction of carbon monoxide and a hydrogen-containing gas which comprises passing said liquid hydrocarbon product together with ammonia in an amount sufficient to substantially inhibit hydrocarbon isomerization and to maintain the pH of the aqueous product above about 6.5, at a temperature of about 500° to about 1100° F. over a catalyst selected from the group consisting of alumina, fuller's earth and bauxite; separating the resultant product into a fraction boiling within the range of from room temperature to 400° F. comprising hydrocarbons boiling in the motor fuel boiling range, a fraction boiling within the range 400° to 650° F. comprising hydrocarbon boiling in the diesel fuel boiling range, and a residual fraction comprising a waxy residue boiling above the diesel fuel fraction; and passing the motor fuel fraction at a temperature of about 500° to about 1100° F. over a catalyst comprising alumina impregnated with anhydrous hydrogen chloride.

7. A process for the catalytic treatment of the total liquid hydrocarbon product containing olefins and oxygenated compounds obtained by the reaction of carbon monoxide and a hydrogen-containing gas which comprises passing said liquid hydrocarbon product together with ammonia in an amount sufficient to substantially inhibit hydrocarbon isomerization and to maintain the pH of the aqueous product above about 6.5, at a temperature of about 500° to about 1100° F. over a catalyst selected from the group consisting of alumina, fuller's earth and bauxite at a space velocity of about 0.1 to 20 volumes of liquid hydrocarbon per volume of catalyst per hour at a pressure not in excess of 200 pounds per square inch; separating the resultant product into a fraction boiling within the range of from room temperature to 400° F. comprising hydrocarbons boiling in the motor fuel boiling range, a fraction boiling within the range 400° to 650° F. comprising hydrocarbons boiling in the diesel fuel boiling range, and a residual fraction comprising a waxy residue boiling above the diesel fuel fraction; and passing the motor fuel fraction at a temperature of about 500° to about 1100° F. over a catalyst comprising alumina impregnated with anhydrous hydrogen chloride, at a space velocity of about 0.1 to 20 volumes of said motor fuel per volume of catalyst per hour at a pressure not in excess of 200 pounds per square inch.

8. A process for the catalytic treatment of the total liquid hydrocarbon product containing olefins and oxygenated compounds obtained by the reaction of carbon monoxide and a hydrogen-containing gas which comprises passing said liquid hydrocarbon product together with ammonia in an amount sufficient to substantially inhibit hydrocarbon isomerization and to maintain the pH of the aqueous product above about 6.5 at a temperature of about 550° to about 750° F. over a catalyst selected from the group consisting of alumina, fuller's earth and bauxite at a space velocity of about 0.5 to 2.0 volumes of liquid hydrocarbon per volume of catalyst per hour at substantially atmospheric pressure; separating the resultant product into a fraction boiling within the range of from room temperature to 400° F. comprising hydrocarbons boiling in the motor fuel boiling range, a fraction boiling within the range 400° to 650° F. comprising hydrocarbons boiling in the diesel fuel boiling range, and a residual fraction comprising a waxy residue boiling above the diesel fuel fraction; and passing the motor fuel fraction at a temperature of about 700° to about 800° F. over a catalyst comprising alumina impregnated with anhydrous hydrogen chloride, at a space velocity of about 0.1 to 1.3 volumes of said motor fuel per volume of catalyst per hour at substantially atmospheric pressure.

9. A process for deoxygenating a hydrocarbon fraction comprising diesel fuel containing olefins and oxygenated compounds obtained by the reaction of carbon monoxide and a hydrogen-containing gas which comprises passing said hydrocarbon fraction at a temperature of about 500° to about 1100° F. over a catalyst selected from the group consisting of alumina, fuller's earth and bauxite, said catalyst having been treated with ammonia in an amount sufficient to substantially inhibit hydrocarbon isomerization and to maintain the pH of the aqueous product above about 6.5.

10. A process for the catalytic treatment of the total liquid hydrocarbon product containing olefins and oxygenated compounds obtained by the reaction of carbon monoxide and a hydrogen-containing gas which comprises passing said liquid hydrocarbon product at a space velocity of about 0.1 to 20 volumes of liquid hydrocarbon per volume of catalyst per hour and a temperature of about 500° to about 1100° F. over a catalyst selected from the group consisting of alumina, fuller's earth and bauxite, said catalyst having been treated with ammonia in an amount sufficient to substantially inhibit hydrocarbon isomerization and to maintain the pH of the aqueous product above about 6.5; separating the resultant product into a fraction boiling within the range of from room temperature to 400° F. comprising hydrocarbons boiling in the motor fuel boiling range, a fraction boiling within the range 400° to 650° F. comprising hydrocarbons boiling in the diesel fuel boiling range, and a residual fraction comprising a waxy residue boiling above the diesel fuel fraction; and passing the motor fuel fraction at a temperature of about 500° to about 1100° F. over a catalyst comprising alumina impregnated with anhydrous hydrogen chloride, at a space velocity of about 0.1 to 20 volumes of said motor fuel per volume of catalyst per hour.

11. A process for the catalytic treatment of the total liquid hydrocarbon product containing olefins and oxygenated compounds obtained by the reaction of carbon monoxide and a hydrogen-containing gas which comprises passing said liquid hydrocarbon product at a temperature of about 500° to about 1100° F. over a catalyst selected from the group consisting of alumina, fuller's earth and bauxite, said catalyst having been treated with ammonia in an amount sufficient to substantially inhibit hydrocarbon isomerization and to maintain the pH of the aqueous product above about 6.5; interrupting the passage of said liquid hydrocarbon product periodically; passing an oxygen-containing gas over the catalyst; subsequently passing ammonia over the catalyst and then resuming the passing of said liquid hydrocarbon product over the ammonia-treated catalyst.

References Cited in the file of this patent

UNITED STATES PATENTS

| | | |
|---|---|---|
| 2,373,153 | Tollefson | Apr. 10, 1945 |
| 2,397,639 | Berg et al. | Apr. 2, 1946 |
| 2,400,409 | Hale et al. | May 14, 1946 |
| 2,470,216 | Keith | May 17, 1949 |
| 2,589,273 | Montgomery et al. | Mar. 18, 1952 |
| 2,700,676 | McGrath | Jan. 25, 1955 |